Figure 1:
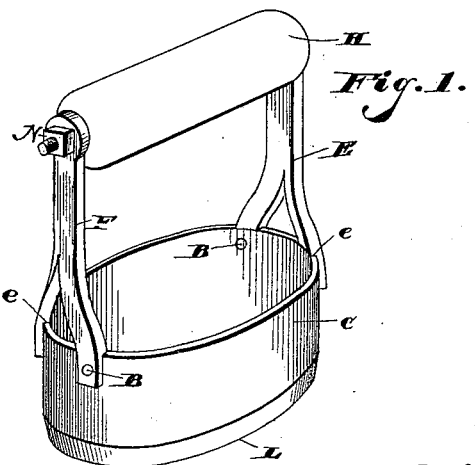

(No Model.)

E. L. MARANVILLE.
CHOPPING KNIFE.

No. 436,043. Patented Sept. 9, 1890.

Witnesses
Samuel Kee
N. T. Collamer

Inventor
Egbert L. Maranville.
By his Attorneys,
C. A. Snow & Co.

UNITED STATES PATENT OFFICE.

EGBERT L. MARANVILLE, OF POULTNEY, VERMONT.

CHOPPING-KNIFE.

SPECIFICATION forming part of Letters Patent No. 436,043, dated September 9, 1890.

Application filed May 22, 1890. Serial No. 352,745. (No model.)

*To all whom it may concern:*

Be it known that I, EGBERT L. MARANVILLE, a citizen of the United States, residing at Poultney, in the county of Rutland and State of Vermont, have invented a new and useful Chopping-Knife, of which the following is a specification.

This invention relates to vegetable-cutters or chopping-knives used therefor; and the object of the invention is to provide a simply-constructed knife for the purpose set forth.

To this end the invention consists of a circular or oval knife, preferably having a transverse knife-edged partition and a handle rising from the edges of said knife, all as hereinafter more fully described, and illustrated in the drawings, in which—

Figure 2:
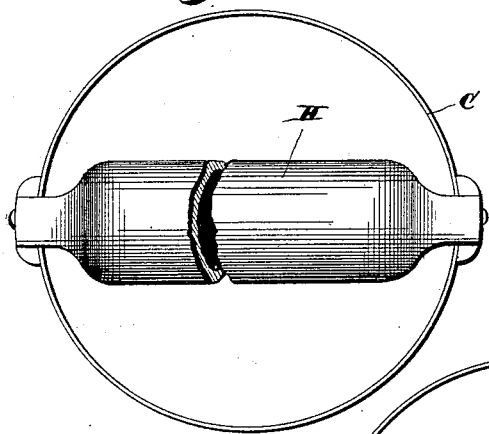
Figure 3:
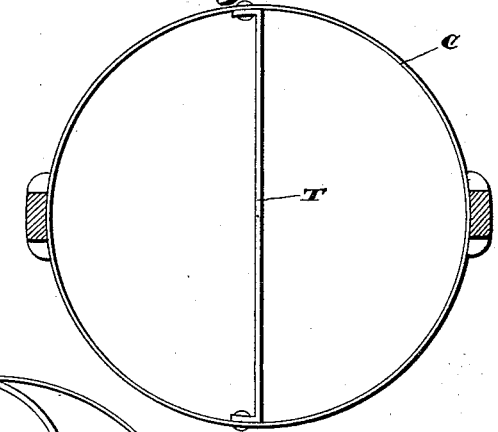
Figure 4:
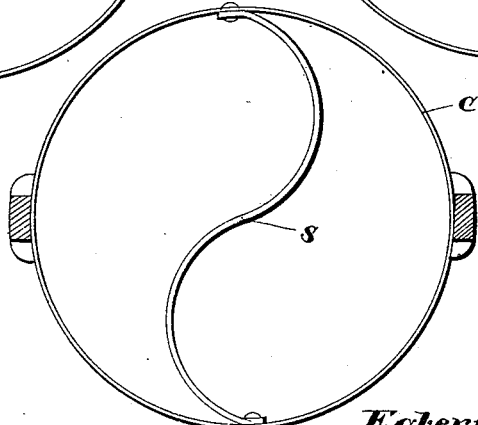

Figure 1 is a perspective view of this improved chopping-knife of oval form. Fig. 2 is a plan view showing a circular knife, but a handle of slightly-different construction. Fig. 3 is a similar plan view of the knife with the handle in section and a transverse knife-blade across the center of the circular knife. Fig. 4 is a plan view similar to Fig. 3, but having a transverse knife-blade of S shape.

Referring to the said drawings, the letter C designates a circular or oval knife having a ground or sharpened lower edge L, and preferably having an S-shaped knife S bolted thereto at its ends and also ground at its lower edge, although a straight transverse blade T, Fig. 3, may sometimes be employed to advantage.

H is a handle, which may be of wood, with a rod therethrough, as shown in Fig. 1, or a tube, as shown in Fig. 2, and the downwardly-bent ends E are provided with shoulders e, resting upon the upper edges of the circular knife C, and connected below such shoulders by bolts B with the knife. If preferred, the ends E may be branched, as shown, whereby four points of connection with the circular knife C will be formed, and if the tubular handle is used its lower ends are flattened and bolted direct to the outer face of the circular knife, as shown in Fig. 2. The lower edge of the knife is preferably ground on the outer face, in order that the vertical opening through the knife will be of the same size from bottom to top.

When this improved chopping-knife is used in a bowl having either a flat or a rounded bottom, the knife C will strike the same throughout its entire length instead of for a few inches, as in knives as heretofore constructed, and even though the bottom of the bowl be rounded the circular knife C (which may be oval to correspond with the shape of the bowl) will strike the bowl throughout the entire length of the knife. If the transverse or S-shaped knife be used, it will give great strength to the circular knife and will strike the bottom of a flat bowl at the same time that the circular knife strikes it, whereby the cutting capacity of the knife is increased without increasing the size of the chopper. It will be obvious that the wooden handle can be removed and the ends E drawn toward each other by the nuts N in Fig. 1, whereby a circular knife would be made oval in shape, if desired, and if the S-shaped knife were employed this change in shape could be effected without removing it.

What I claim is—

1. A chopping-knife consisting of an open blade having a sharpened lower edge, and a handle above said blade having depending ends bolted to the blade, and a bolt through said handle and ends, whereby the distance between said ends may be varied, substantially as described.

2. A chopping-knife having an open blade with a sharpened lower edge and a transverse blade of S shape secured within and across said open blade, substantially as described.

3. A chopping-knife comprising an open blade C, an S-shaped blade S secured within and across the same, a removable handle H at right angles to the length of said cross-blade, end pieces E, connected to said open blade at their lower ends, and a bolt passing through said handle and end pieces, whereby the distance between the latter may be adjusted, substantially as hereinbefore described.

In testimony that I claim the foregoing as my own I have hereto affixed my signature in presence of two witnesses.

EGBERT L. MARANVILLE.

Witnesses:
ANDREW CLARK,
THOMAS C. REED.